(No Model.)
G. O. GRIGGS.
LATHE REST.
No. 271,702. Patented Feb. 6, 1883.
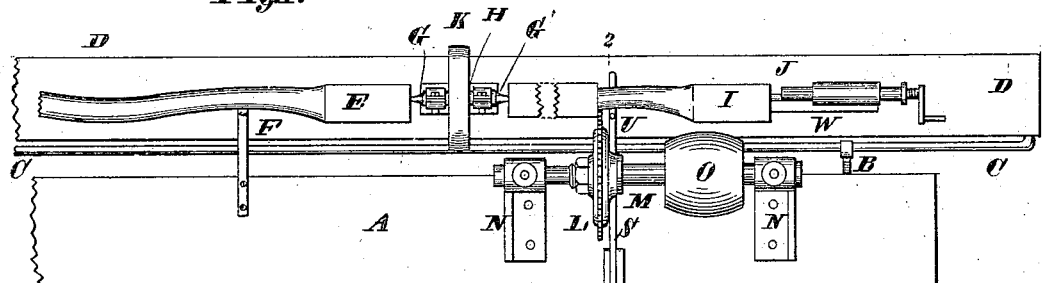
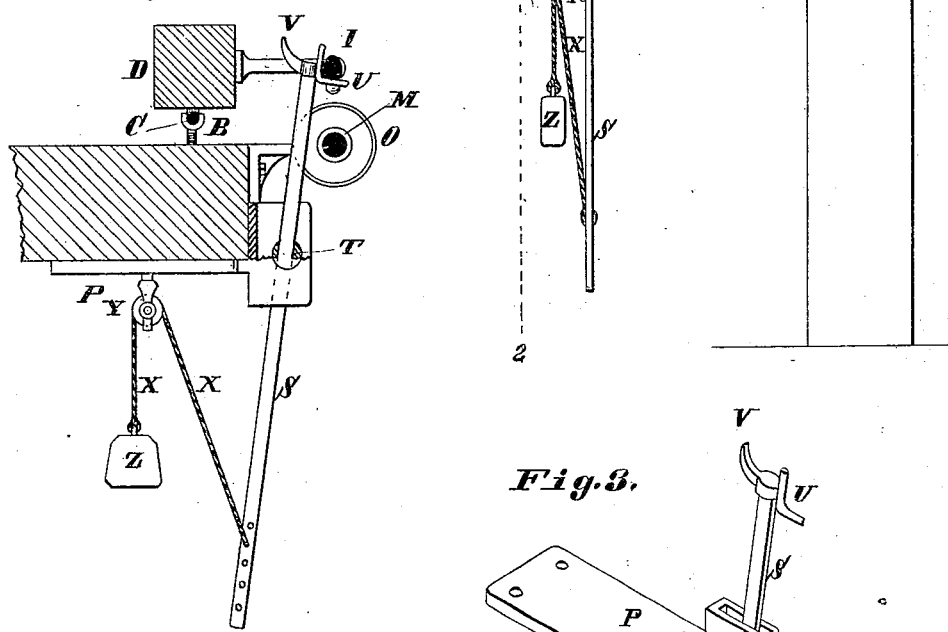
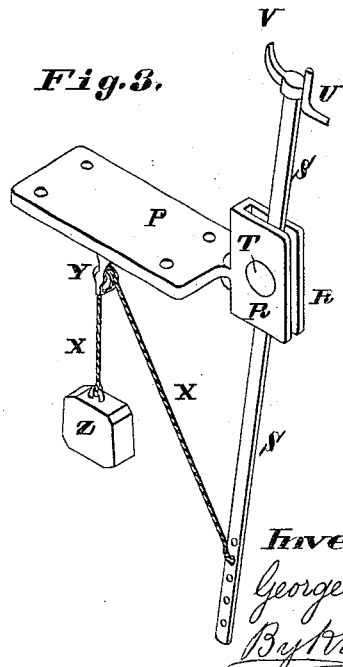
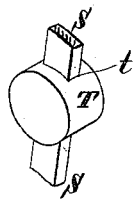
Attest:
Charles Pickles
Wm. J. Sayers
Inventor:
George O. Griggs
By Knight Bros.
Attys

UNITED STATES PATENT OFFICE.

GEORGE O. GRIGGS, OF ST. LOUIS, MISSOURI.

LATHE-REST.

SPECIFICATION forming part of Letters Patent No. 271,702, dated February 6, 1883.

Application filed November 15, 1882. (No model.)

*To all whom it may concern:*

Be it known that I, GEORGE O. GRIGGS, of the city of St. Louis, in the State of Missouri, have invented a certain new and useful Improvement in Lathe-Rests, of which the following is a full, clear, and exact description, reference being had to the accompanying drawings, forming part of this specification.

This rest is intended for use upon the class of lathes for turning irregular forms having considerable length and small section, so that they are liable to vibrate under the action of the tool. It is more particularly adapted to the class of lathes of which the "Blanchard" lathe is the type where a rotary saw or cutter turns in a fixed bearing and the work is carried over the same, my rest being secured to the lathe-bed in proximity to the saw to bear against the object being formed, to prevent vibration.

The improvement consists of an arm having capacity for endwise movement in a fulcrum-block, and borne upward and outward by a weight to force its upper forked end against the object.

Figure 1 is a front view of part of a lathe, showing the improvement. Fig. 2 is a transverse section at 2 2, Fig. 1, giving a side view of the improvement. Fig. 3 is a perspective view of the device detached from the lathe-bed. Fig. 4 is an enlarged perspective detail of the fulcrum-block.

A is the lathe-bed having upon it the standards B, whose upper ends form the bearings of the rock-shaft C, that constitutes the fulcrum-bearing of the rocking carriage D, to which the pattern and object to be turned are secured. The pattern is shown at E resting upon the bearing-block F. It is supported in the usual manner upon a dead or tail center, and a live-center or crow's-foot, G, upon the spindle H. The other end of the spindle carries a live-center, G', upon which one end of the work I is fixed. The other end of the work I is supported on a dead-center, J.

K is a pulley upon the spindle H, to receive the belt by which the spindle with the pattern and work are turned around.

L is the saw by which the object is shaped. The saw is upon a mandrel, M, having bearing on brackets N, secured to the bed A.

O is a belt-pulley, to receive a belt by which the saw is driven.

All the above parts have a usual construction, and need no further description.

P is a bracket, attached to the bed A and having two parallel jaws, R R, between which is the arm or lever S. The jaws give lateral bearing to the lever S, so as to prevent side vibration, while at the same time the lever has freedom of movement upward and downward and vibration on its axis or fulcrum. The fulcrum of the lever S consists of a cylindrical block, T, turning in bearings in the jaws R, and diametrically slotted to allow the passage of the lever S, which fits freely in the slot t, so that it is capable of endwise movement therein. It will be seen that the lever retains the fulcrum-block in place in the jaws, preventing its endwise movement.

U is a fork at the upper end of the lever S, said fork bearing against the under and inner sides of the object being turned, so as to prevent the vibration of the object under the action of the tool or saw.

V is a horn, which is carried beneath a finger, W, when the carriage is near one end of its stroke, to hold down the lever when the work or object is removed from the centers.

X is a cord or chain, one end of which is attached to the lower end of the lever, and which passes over a pulley, Y, hung upon the bed A. Z is a weight attached to the other end of the cord. It will be seen that the action of the weight will be to throw the fork U upward and outward, so that it presses against the under and inner sides of the object being turned at a place in close proximity to the saw. The finger W may be attached directly to the carriage D in place of to the head.

I claim—

1. A rest-lever, S, working between jaws R and through a fulcrum-block having bearing in said jaws, in combination with the cord X, pulley Y, and weight Z, substantially as set forth.

2. The combination of jaws R, cylindrical fulcrum-block having bearing therein and slotted for the passage of lever S, the said lever with forked end U, and the cord X, pulley Y, and weight Z, substantially as set forth.

3. The combination of the movable rest-lever S, substantially as set forth, with horn V at the upper end thereof, and the finger W, fixed to the head carrying the dead-center, or to the carriage, in proximity thereto.

GEORGE O. GRIGGS.

Witnesses:
SAML. KNIGHT,
GEO. H. KNIGHT.